Patented June 26, 1923.

1,460,106

UNITED STATES PATENT OFFICE.

WESLEY G. NICHOLS, OF CHICAGO, ILLINOIS, ASSIGNOR TO AMERICAN MANGANESE STEEL COMPANY, OF CHICAGO, ILLINOIS, A CORPORATION OF MAINE.

ELECTRIC-FURNACE MELTING OF MANGANESE SCRAP.

No Drawing.  Application filed October 27, 1921. Serial No. 510,960.

*To all whom it may concern:*

Be it known that I, WESLEY G. NICHOLS, a citizen of the United States, residing at Chicago, in the county of Cook and State of Illinois, have invented certain new and useful Improvements in Electric-Furnace Melting of Manganese Scrap, of which the following is a specification.

This invention relates to the process of melting manganese steel scrap for reuse in situations where its comparative expensive ingredient manganese is an important factor, and particularly to a process of melting to be carried on in the electric arc furnace.

The advantage has long been recognized of melting manganese steel in a furnace in which the necessary temperature is developed by the electric arc, because of the ready control of temperature by the mere regulation of electric current dimensions, and the preservation of the readily oxidizable manganese element which is afforded by the relatively inert bath-environment which such a furnace insures; and in my U. S. Letters Patent No. 1,291,656, issued January 14th, 1919, I have described a method of recovering manganese steel from scrap, in which the manganese content is further safeguarded by proceeding cautiously during the protracted period heretofore considered necessary in bringing the bath to the fusing point, and insuring against the increase of temperature at the arcing point more rapidly than the recognized relatively low conductivity of the manganese steel would permit of its assimilation or distribution throughout the whole mass, and thereby avoiding the burning of the manganese out of the surface of a piece of scrap before its interior reaches the fusing point; precautions being taken, upon nearing the temperature at which the scrap becomes mushy and breaks down, say about 2200° F., to supply a basic slag protection, and care being taken to keep the bath down to the fusing point (about 2400° F.) unless and until, for the sake of pouring, it becomes necessary to run the temperature up for a brief period to avoid freezing in the ladle.

In the operation of electric furnaces the temperature developed is directly proportional to the wattage, that is to say the product of the voltage and the amperage of the current consumed. In melting manganese scrap, voltage is varied according to the resistance of the charge and the arc desired to be produced. It will generally be higher at the start before the pieces of scrap are reduced, or broken down and the internal resistance of the charge is high, than is required when the charge has become fluid and compact. When the voltage is reduced, amperage is proportionately increased to maintain a wattage corresponding to the heat required. In the ordinary conduct of the electric furnace it is considered desirable, in the interest of economy, to develop as great an arc as possible without diverting it from the bath, or causing it to jump between the electrodes, and to proportionately reduce the amperage; but in practicing my present invention for the melting of manganese steel, and especially manganese steel scrap, I employ high amperage as well as high voltage, with a consequent wattage consumption that is very much higher than that incident to the melting of manganese scrap as heretofore practiced. That is to say, taking, for example, a three ton furnace, instead of starting with a wattage of only about half the capacity of the furnace and gradually bringing the temperature up to the melting point by continuance of the current for a matter of from four to six hours, I deliver to the charge, at once a wattage up to about the full capacity of the furnace, changing the ratio of voltage to amperage only as the resistance of the charge of scrap varies, and bring the bath to the melting point in a fraction of the time heretofore required and before serious loss of manganese has had time to take place.

My present invention is based upon the discovery that temperature alone, at least within the limits required for successfully disposing of the molten metal, e. g. for pouring into molds or mixing with a charge of blow metal, does not necessarily consume the manganese ingredient, but the element of time is an important factor; that the hazard of maganese loss in fusing manganese steel scrap as heretofore conducted has been due largely to what my present experience teaches to have been an excessive duration of application of the melting arc; that the phenomenon of oxidation or chemical combination of oxygen with a metallic base, existing in a mass, is necessarily a matter of surface manifestation and progresses inwardly only as the surface is reduced or new surface is presented by stirring or boiling of the metal; and that if the wattage necessary for melting, be attained very much more rapidly, rather than more gradually than was the practice prior to the invention disclosed in my patent aforesaid, or even attained at the outlet, a heat may be brought to the molten state with a very great saving of time and with a saving in manganese waste proportional to the time reduction. The economy of such a procedure will be apparent.

Having brought the bath to the fusing point, say 2400° F., and having observed the precaution of developing its basic slag covering as it approached the breaking down or mushy state, say around 2200° F., the bath may be safely maintained at 2400° F. until needed by reducing the voltage to that which will merely compensate for heat radiation and with which violent stirring and circulation will be eliminated.

A typical procedure in the preferred application of my present invention would be to charge the desired quantity of manganese scrap into an electric furnace, either cold or while still hot from a previous heat (after cleaning out and making necessary repairs to the lining), adjust the electrodes, and then, instead of delivering a wattage of say one-half or less of furnace capacity and slowly working up to the melting point, supply at once a wattage up to the furnace limit, for instance in a three ton furnace about 2000 kw. and in a six ton furnace about 3000 kw., and maintain this high wattage until complete fusion is attained. By applying the limit wattage from the beginning a very hot arc is produced, and the fusing point is attained throughout the bath, in a very short time, say from one to two hours time instead of in from four to six hours, as heretofore, and serious oxidation will not have been incurred.

I claim:

1. The improvement in the process of melting manganese steel, which consists in charging the steel into an electric furnace, and subjecting the same to an electric arc developed by a wattage that, initially, is substantially up to furnace capacity, and continuing such wattage and thereby bringing the mass to molten state quickly and before oxidation materially depreciates the manganese content.

2. The process of melting manganese steel scrap which consists in charging the manganese steel scrap into an electric furnace and then supplying current to said furnace at initial high wattage and continuing such wattage and thereby quickly bringing the bath to molten state, before oxidation of the manganese can take place.

3. The improvement in the process of melting manganese steel scrap which consists in charging the scrap into an electric furnace, and subjecting the same to an electric arc developed by a wattage initially equivalent, approximately, to the furnace capacity, and bringing the mass to molten state quickly and before oxidation materially depreciates the manganese content.

4. The improvement in the art of melting manganese steel scrap which consists in charging the steel scrap into an electric furnace and there subjecting the same to an electric arc developed by a wattage that is initially equivalent to about the full capacity of the furnace, quickly bringing the bath to a temperature of about 2400° F. by said wattage and then reducing the arc to that which merely maintains fusing temperature without violent stirring or circulation of the bath.

Signed at Chicago, Illinois, this 22nd day of October, 1921.

WESLEY G. NICHOLS.